United States Patent Office 3,396,104
Patented Aug. 6, 1968

3,396,104
PROCESS OF TREATING SALINE WATER
John J. Miller, West Chicago, Ill., assignor to Ocean Minerals, Inc., Chicago, Ill., a corporation of Illinois
No Drawing. Filed May 17, 1965, Ser. No. 456,565
15 Claims. (Cl. 210—54)

This invention relates to a process of treating saline water and, more particularly, to the treatment of natural and artificial brines, including seawater, bitterns, inland brines, brackish waters and similar saline aqueous bodies, to remove therefrom the scale-forming salts, such as the bivalent metal chlorides, in order to facilitate the conversion of the saline water into a potable water. Such conversion can be economically effected, as by distillation, freezing, ion-exchange, dialysis, or other process, once the major portion of the scale-forming salts has been removed.

When distillation processes are used for the conversion of brines into a potable water, the cost of such conversion has been uneconomic, being in the neighborhood of $1.25 to $1.35 per gallon as a minimum. This high cost is largely due to the expense of having to remove the scale formed in the evaporator or other distillation vessel. By the use of the process of my present invention, by far the major proportion of the scale-forming metals, such as the bivalent metals, is removed in advance of the distillation step. In my process, the dissolved solids content exclusive of sodium chloride of the ocean water, or other saline water can be reduced to as low as 10 to 25 parts per million of scale-forming metals (calculated as metals) even where the source water has a metal solids content as high as from 1500 to 2000 parts per million (p.p.m.). The bivalent metals, present principally in the form of the calcium and magnesium salts of the saline water, can readily be removed to less than 25 p.p.m., and generally less than 10 p.p.m., thereby greatly reducing the problem of scaling in the distillation vessels.

In accordance with my method, the saline water is subjected to the action of active amino acid materials derived from any plant protein material, such as waste and by-products, and such as fast-growing vegetable materials. Chlorella, alfalfa, grasses and weeds of all types are examples of the latter. Protein, proteinaceous, protein-type, chlorophyl and other chloroplast substances and materials from these sources are activated by pre-treatment with ammonia and phosphoric acid in that sequence. The ammonia increases the $NH_2$ and hydroxyl (OH) content of the amino acids, while the phosphoric acid supplies carboxyl groups. By this pre-treatment the protein materials are activated to enhance their chelating and complexing properties. It is as a result of these properties that the active amino acids become effective in precipitating the bivalent metal salts in the saline water undergoing treatment.

For best results, a mixture of the plant protein material is first formed with the saline water and the resulting mixture is first treated with ammonia, preferably anhydrous ammonia, while stirring the mass vigorously. An amount of amonia is used that will bring the pH of the mixture to between 8 and 10.5. Thereafter a sufficient amount of phosphoric acid, such as orthophosphoric acid or other phosphoric acid, or, less desirably, sulfuric acid or acetic acid (vinegar), is added, with vigorous stirring, to lower the pH to 7, and preferably to about 8. A heavy flocculent precipitate thereupon forms, which can readily be separated by filtration, or by decanting, or by centrifuging.

In addition to removing the bivalent metals from the saline water, my process produces a precipitate which, after drying, serves as an excellent supplement for livestock feeds, or as the organic base for mineralized fertilizers. Where used as a feed supplement, the absorption and utilization by the animal body are facilitated because of the complexing and/or chelating of the minerals by the active amino acid compounds.

It is therefore an important object of this invention to provide a process of treating saline water to remove therefrom the saline water scale-forming metals that are present therein and thereby make possible an economically feasible conversion of the saline water into a potable water by the further known steps of distillation, freezing, ion-exchange, dialysis and the like.

It is a further important object of this invention to provide a process for the treatment of saline water with active amino acid material capable of precipitating the bivalent metal salts and thereby greatly reducing the scale-forming tendencies of the saline water when subjected to distillation.

It is a further important object of this invention to provide an economical process for the removal of the scale-forming bivalent metals from ocean water, brackish water and the like and thereby make it entirely feasible to convert the source water into drinking water at a total cost much less than the cost of present processes for the conversion of saline into potable water.

Other and further important objects of this invention will become apparent from the following description and appended claims.

As the source of the active amino acids, many various types of plant protein, proteinaceous and protein-type material including mucoproteins, chlorophyl and chloroplasts, may be used. I have found that a fast-growing plant of the algae family is a very satisfactory source material. In this classification, the material that I prefer to use is chlorella, of which there are various strains which are effective, the commonest of which are *C. vulgaris*, *C. pyrenoidosa* and *C. ellipsoidea*. A related type of vegetable material is classed as Scenedesmus genus and includes four very common varieties, viz, *S. obliquus*; *S. caudricauda*; *S. acuminatus*; and *S. apiculatus*. All of these varieties are very high in protein and are well balanced in amino acids from a nutritional standpoint. They are, therefore, not only especially effective in precipitating metals from solution, but are also valuable components of the feeds produced by my process. They are likewise rich in vitamins, which are not destroyed in my process.

Many other wild or cultivated algae can be utilized, but those mentioned above are easily cultivated and can produce up to 1000 tons per acre per year. Other families of algae include Cyanophyceae (blue-green); Zygophceae (greenish); and Chlorophyceae (green and yellow-green). Additionally, common seaweeds and plankton are good materials for use.

There are many other sources of protein material, such as by-products and wastes obtained from the processing of grains, fruits, vegetables and the like. As by-products may be mentioned the residual protein material from the milling and processing of grain, such as milo, corn, wheat, barley, oats and the like, since during the processing of such grains, as for instance in the manufacture of corn oil or glucose, the proteins and other proteinaceous substances are partially broken down into their amino acids and thus serve as good chelating agents. Also, they have valuable dietary qualities, both for animals and humans.

Among other by-products that may be mentioned are citrus by-products, including grapefruit, oranges, lemons, limes, tangerines and kumquats. These may be used in ground dry form or as water extracts. Where pectins are associated with such citrus by-products, their presence is not detrimental, but is even advantageous since the pectins exert some sequestering properties.

Other fruit wastes, such as those from apples, pears, peaches, grapes and the like, which may contain bioflavonoids with chelating properties, are usable as a source of active amino acids.

By-products from trees can also be used, especially the fresh leaves, the inner bark, and the wood layer beneath the bark of many kinds of trees, pine needles and the like. These also contain chelating substances and can be used in a dry form, or water extracts containing their protein and proteinaceous material content can be used for higher concentration of the amino acids.

Other sources of protein material include root crops, such as potatoes, preferably in a dehydrated form to reduce freight costs; fast-growing plants, including alfalfa, weeds and grasses of all types, either in freshly ground or dried condition, or after protein extraction and drying of the protein extract; yeasts of various types, such as brewer's, torula and other types of yeasts; and cereal meals, such as soybean meals from which the oil has been extracted and in which some of the starches have been changed to sugars.

Mixtures of any of the various plant protein materials can be used, such, for instance, as a mixture of two-thirds by weight of dehydrated potatoes and one-third by weight of chlorella. This latter mixture gives excellent results in the process that is described below.

The following will serve to ilustrate a preferred embodiment of my invention, but is intended to be ilustrative and not restrictive upon the scope of my invention.

Example

To one thousand (1000) gallons of ocean water are added 25 lbs. of finely ground plant protein materials, with stirring to effect thorough mixing. The plant protein material used may be any of the source materials above described, but in this example the protein material is a ground mix of one part by weight of soybeans and chlorella in equal proportions, and four parts of potato waste (dehydrated). The temperature of the mixture is maintained within the range of from 50° F. up to 120° F., preferably at approximately 85° F.

The resulting slurry of ocean water and suspended protein material is then treated with 26 lbs. of anhydrous ammonia (either liquefied or gaseous) while stirring vigorously. The addition of the ammonia brings the pH of the slurry to approximately 10.5.

After completion of the introduction of the ammonia, which may require from 15 minutes to 1 hour, there are added 60 lbs. of orthophosphoric acid ($H_3PO_4$). The acid is gradually added with vigorous stirring until all of the acid is added. The pH of the resulting slurry is thereby lowered to approximately 8.0. A heavy flocculent precipitate forms and this precipitate is removed by vacuum filtration. The precipitate, in the form of a filter press cake, is then dried in the air. The weight of the precipitate is about 107 lbs. This precipitate contains the bivalent metals, or their salts, in a chelated or complexed state, with amino acids, the minerals being surrounded by the vegetable protein, either to form completely or partially enveloped micelles.

The precipitate thus formed by the process of the example makes an excellent supplement for livestock feeds or can serve as the organic base for mineralized fertilizer.

The filtrate from the above example contains less than 25 p.p.m. and usually less than 10 p.p.m. of metals content, exclusive of sodium. Consequently, the filtrate is susceptible of conversion into a potable water in a most economical manner, as by distillation. Whereas raw ocean water can be distilled at a cost of approximately $1.25 per thousand gallons, the filtrate resulting from my process can be converted by distillation into a potable water at a cost of approximately $.35 per thousand gallons. There is no clogging or scaling of the distillation equipment, and approximately 8 gallons of fresh water are obtained from the treatment of 10 gallons of ocean water. This is in contrast with the usual recovery of only about 3 gallons of fresh water for every 10 gallons of saline water treated, even where the best of commercial water-recovery operations is used.

The sodium chloride recovered as a by-product of the distillation, or other conversion process used subsequently to my process, is of great value for use as such, since it is of relatively high purity and needs little or no refining before being marketed.

A distinct value of the product of my process is its potential for use as a basic feed or fertilizer product or for the stock-piling of minerals for suitable extraction, separation and refining at a later time.

The purpose of the ammonia and phosphoric acid additions is to convert the plant protein material into active amino acids. The ammonia is believed to provide $NH_2$ groups in the peptide chains, and to develop hydroxyl radicals therein, to make the amino acids thereof more available; and the phosphoric acid supplies carboxyl groups for the same purpose. While sodium hydroxide, or other alkali, could be used to render the aqueous mixture of plant protein material alkaline, free ammonia is required to activate the amino acids of the protein material. Other sources of acid phosphate ions than phosphoric acid can be used, such as other phosphoric acids than ortho, and acid phosphate salts, and other acids such as acetic and sulfuric but the phosphoric acids and acid salts are preferred.

The pH is preferably at least 10, or 10.5 after the ammonia addition, and is reduced to at least 8 and preferably between 7 and 8 by the phosphoric acid addition. Excess amounts of ammonia and of phosphoric acid are not objectionable but, in general, the pH values specified should be maintained for best results.

Other embodiments of my process, using from 20 to 30 lbs. per 1000 gallons of saline water, and using other mixtures of the proteinaceous material, such as mixtures of soybeans, potatoes and chlorella, or specific proteinaceous materials by themselves, such as chlorella, yeast, corn, soybean and potato waste proteins, respectivelly, can be carried out as in the main example and similar results are obtained. Except for economical reasons larger proportions of the proteinaceous materials can be used than the 20–30 lbs. per 1000 gallons given above. Similarly, larger proportions of ammonia and of acid (phosphoric acid, phosphoric acid salts, acetic acid and sulfuric acid) can be used within the pH ranges above specified. Also higher yields of precipitate will be obtained where larger proportions of ammonia, acid and proteinaceous materials are used than those specified in the example.

It will be understood that modifications and variations may be effected without departing from the scope of the novel concepts of the present invention.

I claim as my invention:

1. In a process of treating saline water to reduce its content of scale-forming salts, the steps which comprise:
   mixing with the saline water plant protein, proteinaceous and protein-type material,
   adding a sufficient amount of ammonia to the resulting mixture to bring the pH to at least 10,
   adding a sufficient amount of an acid compound with agitation to reduce the pH of the liquid phase of the mixture to within the range of from 7 to 8 and to effect precipitation, and
   separating the precipitate from the liquid phase of the mixture.

2. The process as defined by claim 1, wherein, said plant protein material is
   a mixture of ground soybeans, potatoes and chlorella.

3. The process as defined by claim 1, wherein the pH is brought to about 10.5 by the addition of ammonia and is reduced to about 8 by the addition of the phosphoric acid compound, and
   after separation of said precipitate the remaining liquid phase has a dissolved metal solids content exclusive of sodium of not over about 25 p.p.m.

4. The process as defined by claim 1, wherein,
said ammonia is added in anhydrous form and
said acid is a phosphoric acid compound.

5. The process as defined by claim 4, wherein,
said plant protein material includes chlorella.

6. In a process of converting saline water containing bivalent metals into water of less than about 25 p.p.m. bivalent metal content, the steps which comprise:
   (1) mixing finely ground plant protein material with a saline water of as high as 1500 p.p.m. of dissolved metals content.
   (2) adding to the resulting mixture sufficient ammonia to bring the pH of said mixture to at least 10,
   (3) adding sufficient phosphoric acid to reduce the pH of said mixture to not over about 8,
   (4) agitating said mixture during steps (2) and (3), and
   (5) separating any precipitate present after step (3) to recover a water having a dissolved metal content exclusive of sodium that is not over about 25 p.p.m.

7. The process as defined by claim 6, wherein
said plant protein includes chlorella, and
said precipitate contains a complex of bivalent metal salts and amino acids.

8. The process as defined by claim 6, wherein,
the saline water is an ocean brine, and
said recovered water is subsequently subjected to distillation to produce a potable water.

9. In a process of treating saline water containing a high content of dissolved bivalent metal salts to reduce the content of such metals, the steps which comprise:
   mixing finely ground plant protein material with said saline water,
   adding to the resulting mixture sufficient ammonia to bring the pH of said mixture to at least 10,
   incorporating in the ammonia-treated mixture a sufficient amount of acid phosphate ions to reduce the pH thereof to a range of between 7 and 8,
   said combination of ammonia and acid phosphate thereby converting the proteinaceous material present into active forms (including amino acids) effective to form a precipitate of proteinaceous bivalent metal complexes, and
   separating the resulting precipitate to recover a water having less than 25 p.p.m. of bivalent metals.

10. The process as defined by claim 9, wherein,
the plant protein material includes the chlorella as a source of active amino acids.

11. The process as defined by claim 9, wherein,
the plant protein material is constituted by a ground mixture of soybeans, potatoes and chlorella.

12. The process defined by claim 9, wherein,
the plant protein material includes soybean protein as the source of active amino acids.

13. The process defined by claim 9
includes yeast protein as a source.

14. The process defined by claim 9
includes corn protein as a source.

15. The process defined by claim 9
includes potato waste protein as a source.

References Cited
UNITED STATES PATENTS

| | | | |
|---|---|---|---|
| 117,462 | 7/1871 | Rickard | 252—82 |
| 2,271,499 | 1/1942 | Rice | 252—180 |
| 3,261,765 | 7/1966 | Spray | 203—7 |

MICHAEL E. ROGERS, *Primary Examiner.*